Sept. 28, 1943. R. W. CANFIELD 2,330,677
DRIVE MECHANISM
Filed Feb. 12, 1941

INVENTOR
RICHARD W. CANFIELD
BY
ATTORNEYS

Patented Sept. 28, 1943

2,330,677

UNITED STATES PATENT OFFICE 2,330,677

DRIVE MECHANISM

Richard W. Canfield, Middletown, N. Y., assignor to Clemson Bros., Inc., Middletown, N. Y., a corporation of New York Application February 12, 1941, Serial No. 378,573

2 Claims. (Cl. 192—46)

This invention relates to drive mechanisms, and more particularly to a one-way shuttle pin drive especially adapted for use in lawn mowers to drive the cutting reel.

The shuttle pin type of drive as heretofore applied to lawn mowers has been found to have several defects. In the construction which has been much used in the past, the bearing area has been laterally displaced as compared with the center of driving engagement between the shuttle pin and the pinion gear or other element with which the clutch is associated, and the space in which the shuttle pin has operated has offered no bearing for the pinion gear. This has resulted in "wobbling" of the gear on the reel shaft due to the eccentric hammering from the shuttle pin when it engages in the pinion. This in turn causes rapid wear and noisy gears, and in general rapid deterioration of the assembly.

It is one object of this invention to eliminate these defects.

It is another object of my invention to provide a rotary member with shuttle pin drive wherein the engagement of the drive produces a driving torque about the axis of said member substantially without angular thrust away from the plane of rotation.

It is another object of my invention to provide a shuttle pin clutch which will be less noisy, better wearing, more certain of engagement than prior shuttle pin clutches, and which will introduce a minimum of friction when the relative movements of the shaft and pinion are such that no engagement should occur.

Another object of my invention is to allow the use of a narrower center to center wheel distance with the same cutting width.

In the accompanying drawing and the following description, I have shown and described a number of preferred embodiments of my invention and various modifications thereof and have suggested various alternatives. These are not intended to be exhaustive nor limiting of the invention but on the contrary are given for the purpose of illustrating the invention and instructing others in the principles thereof and the best manner of adapting the invention to practical use, in order that others may be enabled to modify it and apply it in numerous forms, each as may be best suited to the conditions and requirements of any particular use.

Figure 1:
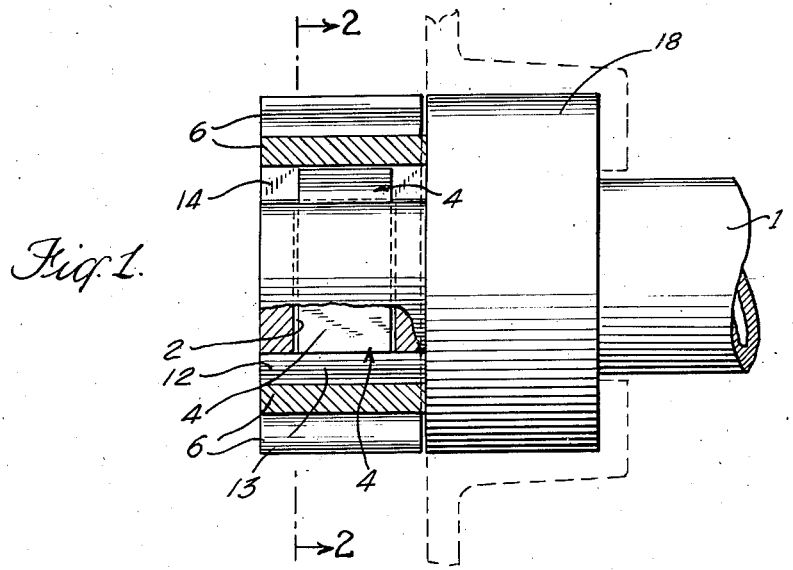
Fig. 1 is a sectional view of a pinion and shuttle pin drive mechanism made in accordance with the preferred form of my invention.
Figure 2:
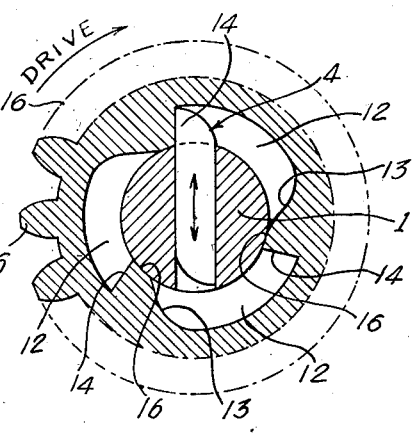
Fig. 2 is an end section taken along the line 2—2 of Fig. 1.

Referring first to the drawing, I have shown a torque transmitting means, e. g., a shaft 1, which in the case illustrated is the shaft of the cutter reel of a rotary lawn mower. This shaft is slotted at 2, near its ends and is provided in said slots with shuttle pins 4, and is supported by bearings, e. g., the ball bearing 18. Each shuttle pin 4 fits loosely in its slot 2 and is preferably of uniform section so as to slide easily to any position.

Over each end of the shaft and shuttle pin is slipped the pinion gear 6, which in this case is the driven member. Inside, the pinion gear is cut to the modified clover-leaf form, as shown, with the three spaces 12, contoured so that at any angle there is sufficient length between the opposite walls to receive the entire length of the shuttle pin, and with sloping walls 13 to cam the shuttle pin from one space through the slot into the opposite space. Thus, if the pinion is rotated in one direction the shuttle pin will come against one of the shoulders 14 at the end of one space and it will make a direct engaging drive connection between the shaft and the pinion. If, on the other hand, the pinion is rotated in the opposite direction, the shuttle pin will be cammed freely back and forth through the slot 2 by the cam faces 13, there being no drive in that direction.

The spaces 12 are so formed as to leave shoulders 16 which are fitted to and provide the bearing surface on the shaft. These bearing surfaces run the entire width of the pinion and are made with sufficient arc of contact to provide sufficient bearing area. The pinion 6, or at least these bearing portions 16, are made of more malleable material, e. g., zinc alloy die-castings, than the shaft 1 and the shuttle pin 4, which may be for example a tough steel.

In the operation of a mower utilizing my invention the shuttle pin will be repeatedly brought into impact contact with the shoulders 14 as the direction of the machine is reversed. This impact contact will cause the bearing surfaces 16 to be swedged against the shaft, and will maintain the bearing surface in intimate contact in spite of wear occurring. The pinion gear may be satisfactorily either a die-casting or a cut steel or bronze gear to produce this effect. It will be noticed from the construction that a gear made according to my invention is symmetrical, and it is an important advantage of my invention that instead of requiring right and left hand pinions, the same pinion is used on both sides of a mower, merely being turned around to provide the correct direction of drive.

Additional bearing may be provided at either or both sides to take the wear while the pinion is spinning free on the shaft, but the shock of engagement from the shuttle pin is centered on the bearing faces 16 so that there is no unsupported twist of the pinion toward or away from the shaft.

The pinion may be prevented from slipping endwise of the shaft, as in prior mower designs, by the frame or housing of the machine or, as shown, the bearing 18 on one side and the wheel on the other which may be positioned close to the end of the shaft so as to allow the pinion little or no end play.

It is to be understood, of course, that while I have shown the spaces 12, in which the shuttle pin moves, to be of a particular shape, this shape is not essential to my invention; and many other forms and shapes are suitable, and particularly if different numbers of spaces are used.

Figure 3:
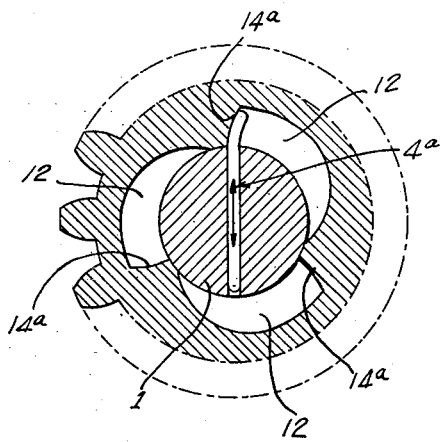
Fig. 3 is an end section view of a modified form of my invention.

In Fig. 3, I have shown a form of construction utilizing a straight shuttle pin, rectangular in cross-section, and without projections.

The shuttle pin, as shown in Fig. 3, is advantageously of resilient metal so that by yielding, as hereinafter set forth, a part of the shock of engagement is absorbed without being transmitted to other parts of the mechanism.

The shoulders 14a, as shown, are curved somewhat away from the relaxed form of the shuttle pin 4a, so that they engage the pin first at its outer end and engagement is increased gradually down to the shaft as the pin yields resiliently. This allows the resilient pin to take up the shock of engagement and avoid a hammering of the parts which in existing drives has caused excessive noise and rapid deterioration.

The shuttle pin might have other shapes or might be tapered or curved in one way or the other. While I have shown in the figures a pinion 6, this is not an essential part of my present invention and, for example, the member thus associated with the clutch might be a sprocket wheel driven by a chain or a pulley for a belt drive, or any other rotating part.

What I claim is:

1. In a construction including a rotatable shaft and an annular member coaxially mounted thereon, the periphery of the annular member constituting a driving surface, an overrunning clutch for establishing a driving connection between said member and said shaft upon relative movement thereof in one direction which comprises, a shuttle pin diametrically slidable in said shaft, said pin being of greater length than the diameter of the shaft and of lesser width than the length of the annular member, said annular member having a central bore therein receiving said shaft in bearing engagement and having an odd number of like recesses therein in communication with the bore and equally spaced circumferentially thereabout, all of the recesses having a sloping cam face at a common end for camming the shuttle pin diametrically, and a substantially radial face for engaging the side of the shuttle pin, the bore and the recesses in said member all extending for the full axial length of said annular member, the mid point of the width of said shuttle pin and the mid point of the length of said annular member lying in a common plane normal to the axis of said shaft, whereby the shuttle pin is centered with respect ot the moment of force applied to the driving member.

2. An overrunning clutch for establishing a driving connection between a rotatable shaft and an annular member coaxially mounted on said shaft, upon relative movement thereof in one direction, which comprises a shuttle pin diametrically positioned in and slidably engaging said shaft, said pin being resilient and of greater length than the diameter of the shaft, said annular member having a central bore receiving said shaft in bearing engagement and having an odd number of like recesses therein in communication with the bore and equally spaced circumferentiallly thereabout, all of said recesses having a sloping cam face at the same end thereof for camming the shuttle pin diametrically and an approximately radial face at the opposite end thereof for engaging the side of the shuttle pin, said latter face being slightly curved in a direction toward the cam face of the same recess whereby to engage first the end of the shuttle pin and gradually more of its length and thus to absorb at least a part of the shock of engagement in resilient flexing of said pin against said curved face, the mid point of the width of said shuttle pin and the mid point of the axial length of said annular member lying in a common plane normal to the axis of said shaft, whereby the shuttle pin is centered with respect to the moment of force applied to the driving member.

RICHARD W. CANFIELD.